United States Patent
Zweigle et al.

(10) Patent No.: US 12,182,934 B2
(45) Date of Patent: Dec. 31, 2024

(54) FOUR-DIMENSIONAL DATA PLATFORM USING AUTOMATIC REGISTRATION FOR DIFFERENT DATA SOURCES

(71) Applicant: FARO Technologies, Inc., Lake Mary, FL (US)

(72) Inventors: Oliver Zweigle, Stuttgart (DE); Thorsten Brecht, Gussago (IT)

(*) Notice: Subject to any disclaimer, the term of this patent is extended or adjusted under 35 U.S.C. 154(b) by 131 days.

(21) Appl. No.: 17/967,221

(22) Filed: Oct. 17, 2022

(65) Prior Publication Data

US 2023/0119214 A1 Apr. 20, 2023

Related U.S. Application Data

(60) Provisional application No. 63/262,658, filed on Oct. 18, 2021.

(51) Int. Cl.
| | |
|---|---|
| *G06T 17/00* | (2006.01) |
| *G01S 17/894* | (2020.01) |
| *G06T 7/33* | (2017.01) |
| *G06T 7/73* | (2017.01) |
| *G06T 19/00* | (2011.01) |

(52) U.S. Cl.
CPC ............ *G06T 17/00* (2013.01); *G01S 17/894* (2020.01); *G06T 7/337* (2017.01); *G06T 7/74* (2017.01); *G06T 19/00* (2013.01); *G06T 2207/10028* (2013.01); *G06T 2210/56* (2013.01)

(58) Field of Classification Search
CPC ....... G06T 19/00; G06T 17/005; G06T 17/00; G06T 7/337; G06T 7/30; G06T 7/74; G06T 2207/10028; G06T 2207/30184; G06T 2210/56; G06T 2210/61; G06T 2207/10016; G06T 19/20; G06T 2200/04; G01S 17/894; G06F 3/0346; G06F 3/04845; G06V 20/64; G06V 10/764; G06V 20/20

See application file for complete search history.

(56) References Cited

U.S. PATENT DOCUMENTS

| | | | |
|---|---|---|---|
| 9,396,669 B2 * | 7/2016 | Karkanias | A61B 34/37 |
| 2013/0155058 A1 * | 6/2013 | Golparvar-Fard | G06Q 10/06311 345/419 |
| 2013/0202197 A1 * | 8/2013 | Reeler | G06T 7/20 382/154 |
| 2019/0325089 A1 | 10/2019 | Golparvar-Fard et al. | |
| 2020/0292297 A1 * | 9/2020 | Atala | G01B 11/25 |

(Continued)

OTHER PUBLICATIONS

Godinho et al., BIM as a Resource in Heritage Management: An Application for the National Palace of Sintra, Portugal. Journal of Cultural Heritage. 2020;43:153-62.

(Continued)

*Primary Examiner* — Xilin Guo
(74) *Attorney, Agent, or Firm* — McCarter & English, LLP

(57) ABSTRACT

A method is provided that includes generating a four-dimensional (4D) model of an environment based on three-dimensional (3D) coordinates of the environment captured at a first point in time. The method further includes updating the 4D model based at least in part to an update to at least a subset of the 3D coordinates of the environment captured at a second point in time. The method further includes enriching the 4D model by adding supplemental information to the model.

18 Claims, 8 Drawing Sheets

(56) References Cited

U.S. PATENT DOCUMENTS

2022/0397917 A1* 12/2022 Arksey .................. H04W 4/40

OTHER PUBLICATIONS

Golparvar-Fard et al., D4AR—A 4-Dimensional Augmented Reality Model For Automating Construction Progress Monitoring Data Collection, Processing and Communication. J. Information Technology in Construction. Jun. 2009;14:25 pages.

Han et al., Potential of Big Visual Data and Building Information Modeling for Construction Performance Analytics: An Exploration Study. Automation in Construction. 2017;73:184-98.

Qu et al., Usage of 3D Point Cloud Data in BIM (Building Information Modelling): Current Applications and Challenges. J. Civil Engineering & Architecture. 2015;9:1269-78.

Wang et al., Computational Methods of Acquisition and Processing of 3D Point Cloud Data for Construction Applications. Archives of Computational Methods in Engineering. 2020;27:479-99.

* cited by examiner

FOUR-DIMENSIONAL DATA PLATFORM USING AUTOMATIC REGISTRATION FOR DIFFERENT DATA SOURCES

BACKGROUND OF THE DISCLOSURE

The subject matter disclosed herein relates to method of system and method for the generation of a single spatial model from different data sources.

There exist a number of devices that generate three-dimensional (3D) point clouds or images in different resolutions. As used herein the term "point cloud" refers to a collection of 3D coordinates in an environment. Furthermore, there exits millions of sensors that generate small datasets and that can be connected to the point cloud via protocols such as Internet of things for example, but that do not have any location or time information ("Four Dimensional" or "4D"). Merging all these datasets together in one location- and time-based model is not possible or requires a long manual process including different software applications. Furthermore, a process to relocate in such a dataset with simple data like images is also not available.

FIG. 1 shows an overview of a prior art system 100. Different scanning devices 102 are creating different types of data (e.g., point clouds, images, floor plans), but all end up in different data files and cannot be viewed and searched as one dataset despite most of them containing location based information. The user ends up with three different data files of the same structure.

Accordingly, while existing scanning systems and data structures are suitable for their intended purposes the need for improvement remains, particularly in providing a system and method having the features described herein.

BRIEF DESCRIPTION OF THE DISCLOSURE

In one exemplary embodiment, a method is provided. The method includes generating a four-dimensional (4D) model of an environment based on three-dimensional (3D) coordinates of the environment captured at a first point in time. The method further includes updating the 4D model based at least in part to an update to at least a subset of the 3D coordinates of the environment captured at a second point in time. The method further includes enriching the 4D model by adding supplemental information to the model.

In addition to one or more of the features described herein, or as an alternative, further embodiments of the method may include that generating the 4D model includes performing at least one selected from a group consisting of feature detection and matching, object recognition and matching, and pairwise registration.

In addition to one or more of the features described herein, or as an alternative, further embodiments of the method may include that the feature detection and matching is performed using a random sample consensus approach to identify feature matches.

In addition to one or more of the features described herein, or as an alternative, further embodiments of the method may include that the pairwise registration is performed using a two-dimensional approach to collapse the 3D coordinates into a pre-defined plane.

In addition to one or more of the features described herein, or as an alternative, further embodiments of the method may include that the pairwise registration is performed using a cloud2cloud algorithm.

In addition to one or more of the features described herein, or as an alternative, further embodiments of the method may include that generating the 4D model includes performing post processing on the 3D coordinates.

In addition to one or more of the features described herein, or as an alternative, further embodiments of the method may include that the post processing includes at least one selected from a group consisting of removing a stray point, removing a transient object, moving an object, removing a reflection, and performing denoising.

In addition to one or more of the features described herein, or as an alternative, further embodiments of the method may include that the 3D coordinates are obtained from at least one device selected from the group consisting of a laser scanner, a lidar sensor of a smartphone or mobile scanner, and an imaging device via a photogrammetry technique.

In addition to one or more of the features described herein, or as an alternative, further embodiments of the method may include that updating the model includes registering the at least the subset of the 3D coordinates of the environment to the 4D model.

In addition to one or more of the features described herein, or as an alternative, further embodiments of the method may include that the supplemental information includes text, an image, or data from an internet of things device.

In addition to one or more of the features described herein, or as an alternative, further embodiments of the method may include that a timestamp is associated with the supplemental information.

In addition to one or more of the features described herein, or as an alternative, further embodiments of the method may include that enriching the 4D model includes localizing the supplemental information to the 4D model.

In addition to one or more of the features described herein, or as an alternative, further embodiments of the method may include processing and analyzing the 4D model.

In addition to one or more of the features described herein, or as an alternative, further embodiments of the method may include archiving at least a portion of the 4D model.

In another exemplary embodiment a system includes a memory having computer readable instructions and a processing device for executing the computer readable instructions, the computer readable instructions controlling the processing device to perform operations. The operations include generating a four-dimensional (4D) model of an environment based on three-dimensional (3D) coordinates of the environment captured at a first point in time. The operations further include updating the 4D model based at least in part to an update to at least a subset of the 3D coordinates of the environment captured at a second point in time. The operations further include enriching the 4D model by adding supplemental information to the model.

In addition to one or more of the features described herein, or as an alternative, further embodiments of the system may include that the operations include a 3D coordinate measurement device to capture the 3D coordinates of the environment.

In addition to one or more of the features described herein, or as an alternative, further embodiments of the system may include that the 3D coordinate measurement device is a laser scanner.

In addition to one or more of the features described herein, or as an alternative, further embodiments of the system may include that the supplemental information is captured by a camera.

In yet another exemplary embodiment a method is provided. The method includes localizing a sensor within an existing environment. The method further includes registering a new dataset in an existing model. The method further includes merging different qualities and overwrite only new elements with lower quality data. The method further includes maintaining dimension of time in dataset.

In addition to one or more of the features described herein, or as an alternative, further embodiments of the method may include that the localizing of the sensor further includes comparing and matching features of the existing point cloud with a new scan and deduct a position in 3D space.

The above features and advantages, and other features and advantages, of the disclosure are readily apparent from the following detailed description when taken in connection with the accompanying drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

Figure 1:
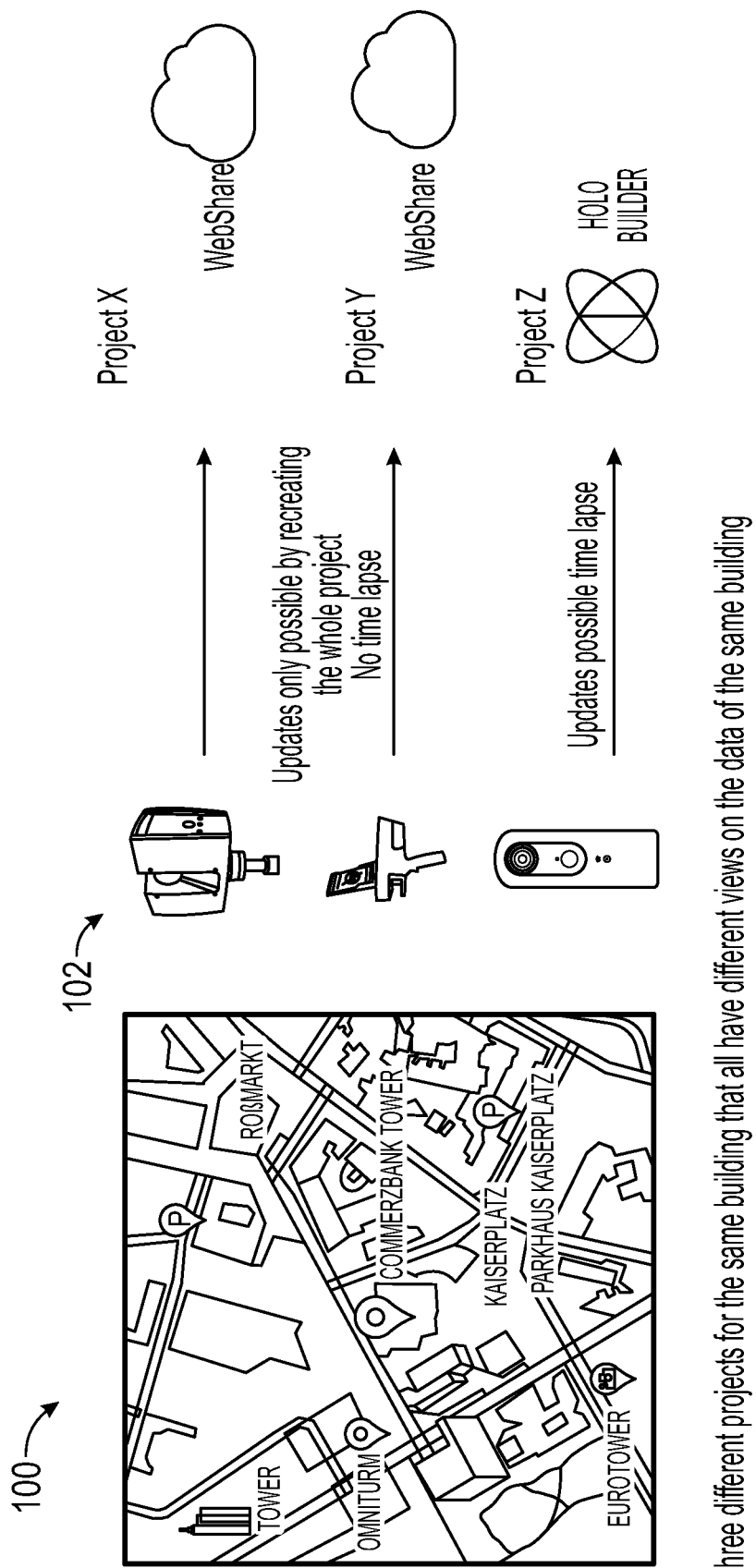
FIG. 1 is a schematic illustration of a prior art system for managing three-dimensional scan data.

The detailed description explains embodiments of the disclosure, together with advantages and features, by way of example with reference to the drawings.

DETAILED DESCRIPTION OF THE DISCLOSURE

Embodiments of the present disclosure provide for a system and method that merge different kinds of sensor data in one location- and time-based model using different techniques like photogrammetry, point cloud-registration etc. Embodiments of the present disclosure provide for a system and method of automating a process to quickly merge and register all this kind of data.

One or more embodiments described herein provide a four-dimensional (4D) unified model. As described herein, 4D indicates three spatial dimensions (e.g., x, y, and z coordinates) and a temporal dimensional (e.g., time). The fourth dimensional (e.g., the temporal dimension) is related not only to the spatial data but also to other data, such as supplemental information (e.g., images, text, videos, audio, models, live-data from machines, assets or even product characteristics (e.g. measured dimensions of a produced part throughout the manufacturing process), and/or the like, including combinations and/or multiples thereof) as described herein. The 4D unified model can incorporate 3D information, 2D information (e.g., images, frame images, panoramic images, and/or the like, including combinations and/or multiples thereof.), meta data (e.g., asset names, types, and other static specifications) and operational data (e.g., condition of an asset or building), and supplemental information (e.g., general human readable information such as descriptions, notes, tasks; environmental data such as temperature, humidity, volatile organic compounds; and/or machine specific data such as general health values, production information, log files; and/or the like, including combinations and/or multiples thereof), and/or the like, including combinations and/or multiples thereof.

According to one or more embodiments described herein, the 4D model described herein provides for combining 3D data from different sources and formats (e.g., point cloud, 360 images, 2D floor plans, meshes and computer aided design (CAD) models, building information modeling (BIM) models, and/or the like, including combinations and/or multiples thereof) and provides for adding supplemental information to the 4D model.

According to an embodiment, the spatial dimensions can be represented as a skeleton. For example, other data can be localized in the 3D data or without 3D data, the position of auxiliary data can be estimated, such as based on a user input, pre-defined values, photogrammetry, other position information such as global positioning system (GPS) data, and/or the like, including combinations and/or multiples thereof.

The spatial dimensions can be time trackable using the temporal dimension. For example, the spatial dimensions can have a timestamp associated therewith. For example, multiple 3D scans for location (e.g., room, building, assembly line, and/or the like, including combinations and/or multiples thereof) can be captured and may have different data quality when captured with different types of devices. In other examples, the data qualities may be the same or similar (e.g., taken from approximately the same location). In some cases, multiple arbitrary measurements may be present. According to one or more embodiments described herein, there can be a link between the temporal (fourth) dimensions and the fact that one or more embodiments can combine different 3D scans of different quality into one model.

According to one or more embodiments described herein, the 4D model can be stored in and interacted with via a cloud computing environment.

According to one or more embodiments described herein, the 4D model provides for interacting with data along each of the four dimensions. It should be appreciated that the 4D model supports interaction with various kinds of data which would typically not be localized in a 3D model (e.g., machine specific information) or that different users may interact with completely different data (e.g., 3D information, images, environmental data, log files, and/or the like, including combinations and/or multiples thereof) although the data can be managed by the same model structure as described herein.

Figure 2:
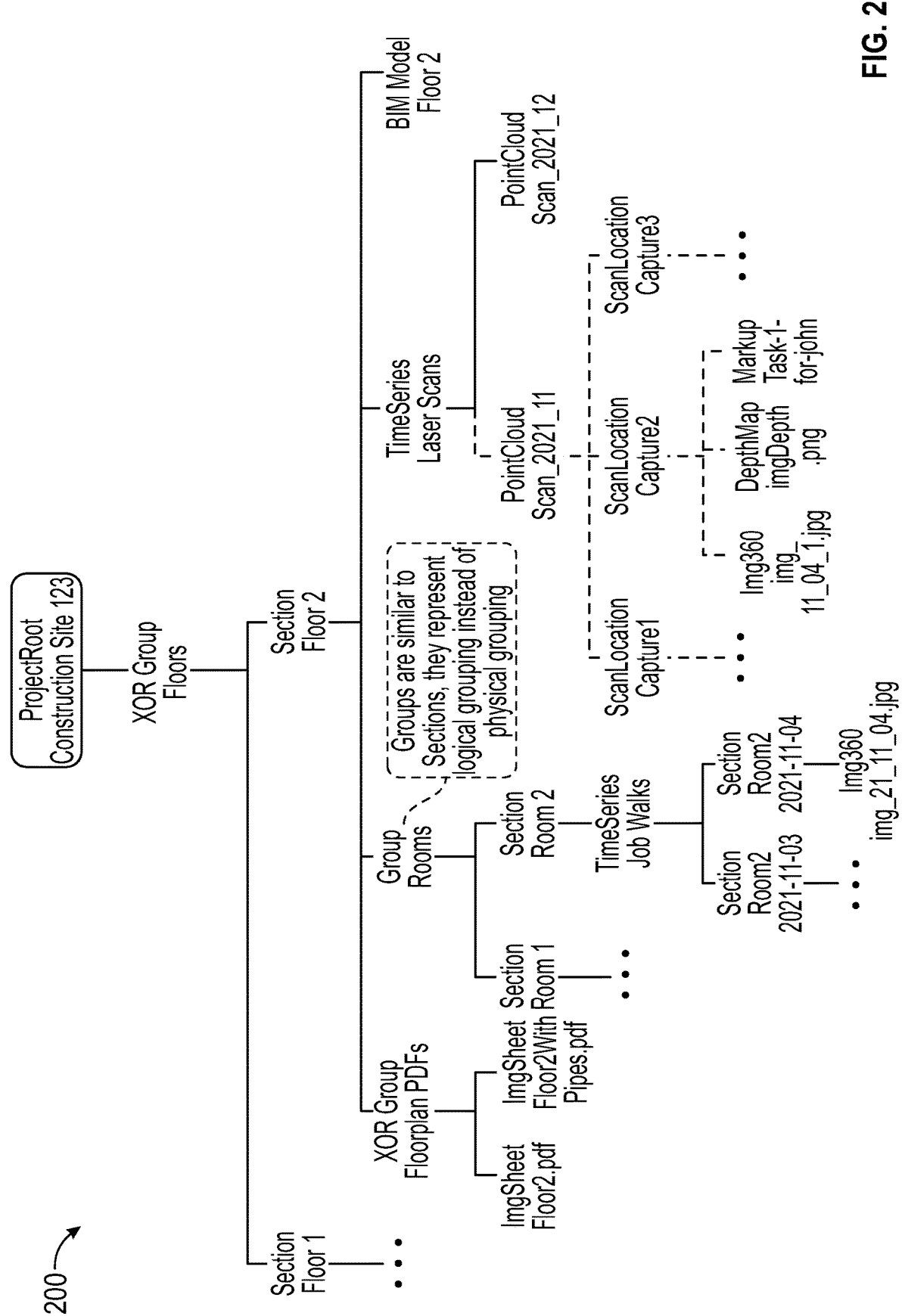
FIG. 2 is a diagram of a flexible 3D scene-graph tree structure used to represent a project according to one or more embodiments described herein.

According to one or more embodiments described herein, interaction with the 4D model can be enabled by a specific data structure and/or application programming interface (API) to access the data structure. For example, the specific data structure can be a flexible 3D scene-graph tree structure 200 used to represent a project, such as shown in FIG. 2, according to one or more embodiments described herein. A project is a scan, or multiple scans, of an environment (e.g., a building), which may be used to build a 4D model as described herein. Nodes in the tree identify entities in the project the user can easily understand, for example, buildings, floors, point clouds, 360 images, scan locations, building information modeling (BIM) models, 2D images, videos, markups, notes, tasks, and/or the like, including combinations and/or multiples thereof. Nodes can have generic properties such as a type, name, pose (position+rotation+scale), optional list of children, optional labels, and/or the like, including combinations and/or multiples thereof. According to one or more embodiments described herein, nodes have unique identifiers (UUIDs) that can be client side generated and are a sequential/partially ordered UUID according to one or more embodiments described herein. Nodes can have a relative pose (position+rotation+scale) in their parent. According to one or more embodiments described herein, the pose and the pose fields can be omitted to provide a subtree that represents a logical collection of items that typically do not contain any poses. If a value of the pose is null/missing, the identity can be assumed, so "zero" for position and rotation and "one" for scale.

According to one or more embodiments described herein, nodes have a 3D position in their parent to represent arbitrary 3D (or 2D) structures like buildings, factories, machinery, construction sites, and/or the like, including combinations and/or multiples thereof. The 3D position can be based on or determined using GPS, for example. If anywhere in the tree GPS reference data is available (e.g., by capturing images that contain GPS positions as metadata), for other data in the tree also, such a Global Positioning Satellite System (GPS) information can be calculated. According to one or more embodiments described herein, the GPS information is a field in the pose objects according to an example (e.g., next to position, rotation, scale) and it contains latitude/longitude and altitude information and/or measurements for latitude/longitude accuracy and/or altitude accuracy. Stored GPS information can conflict with the position values of the same node if the parent for example also has GPS information and the child has both a position and GPS information. In this case, it can be decided whether to reject such mutations since at least one of the parent GPS information, the child GPS information, or the child local position information is incorrect. According to one or more embodiments described herein, a data model layer can be aligned to what a meta model defines as the correct coordinate system.

The API that is used to access the data structure (e.g., the flexible 3D scene-graph tree structure 200) can provide for querying data and/or adding/changing content within the data structure. API functionality can be hidden in one or more embodiments to restrict what a third-party user can do/access.

According to one or more embodiments described herein, access to the data structure can be controlled using a flexible permission model for any subtree and/or individual nodes. For example, a user might be able to see multiple scan locations with attached 360 images but is only allowed to add issues to the project and not additional laser scans. Another user might only be permitted to see the latest scanned point clouds per floor (and not the ones that previously scanned on these floors), and is not permitted to make any changes. Yet another user may be permitted to add or modify enrichments, such as annotations. Yet another user may be permitted to share images of a certain floor at a certain date/time. Yet another user may be permitted to extract specific Internet of Things (IoT) data (e.g., data received from an IoT device, such as a smart sensors, smart appliances, wearable computing devices, medial sensors, security system sensors, coordinate measurement devices, cameras, and/or the like, including combinations and/or multiples thereof) without being permitted to extract or modify any 3D data. These and other permissions are possible.

The data structure provides for efficient production scaling, such as up to billions of nodes. For example, the data structure provides for scaling regarding query performance on the trees. As examples, the following queries work efficiently on a relational database. "Return all BIM model nodes that are labeled with category xyz and were modified in the last 10 days"; "Count all scan locations in the project that are in subtree x of the overall project tree"; "Return all tasks of all the projects of company x that are assigned to user y and are due in the next days"; and "Count how many scan locations were created in the last 7 days for all projects combined of company x". Of course, other queries are also possible.

Figure 3:
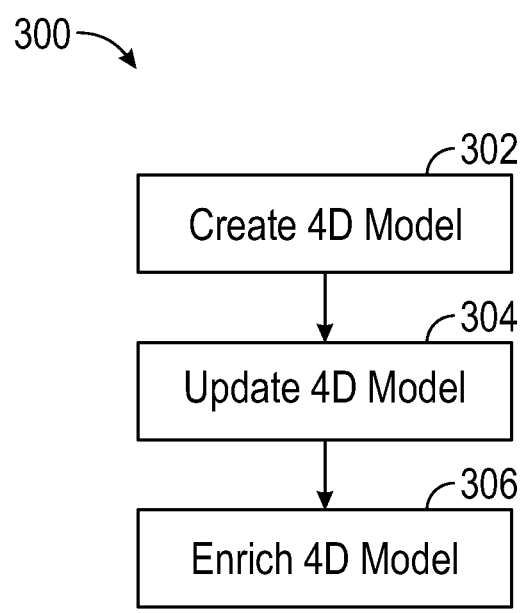
FIG. 3 depicts a flow diagram of a method for creating, updating, and enriching a 4D model according to one or more embodiments described herein.

One or more embodiments described herein provide for creating a 4D model, updating the 4D model, and enriching the 4D model. For example, FIG. 3 depicts a flow diagram of a method 300 for creating, updating, and enriching a 4D model according to one or more embodiments described herein. The method 300 can be implemented by any suitable system or device, such as the processing system 800 of FIG. 8.

Figure 4:
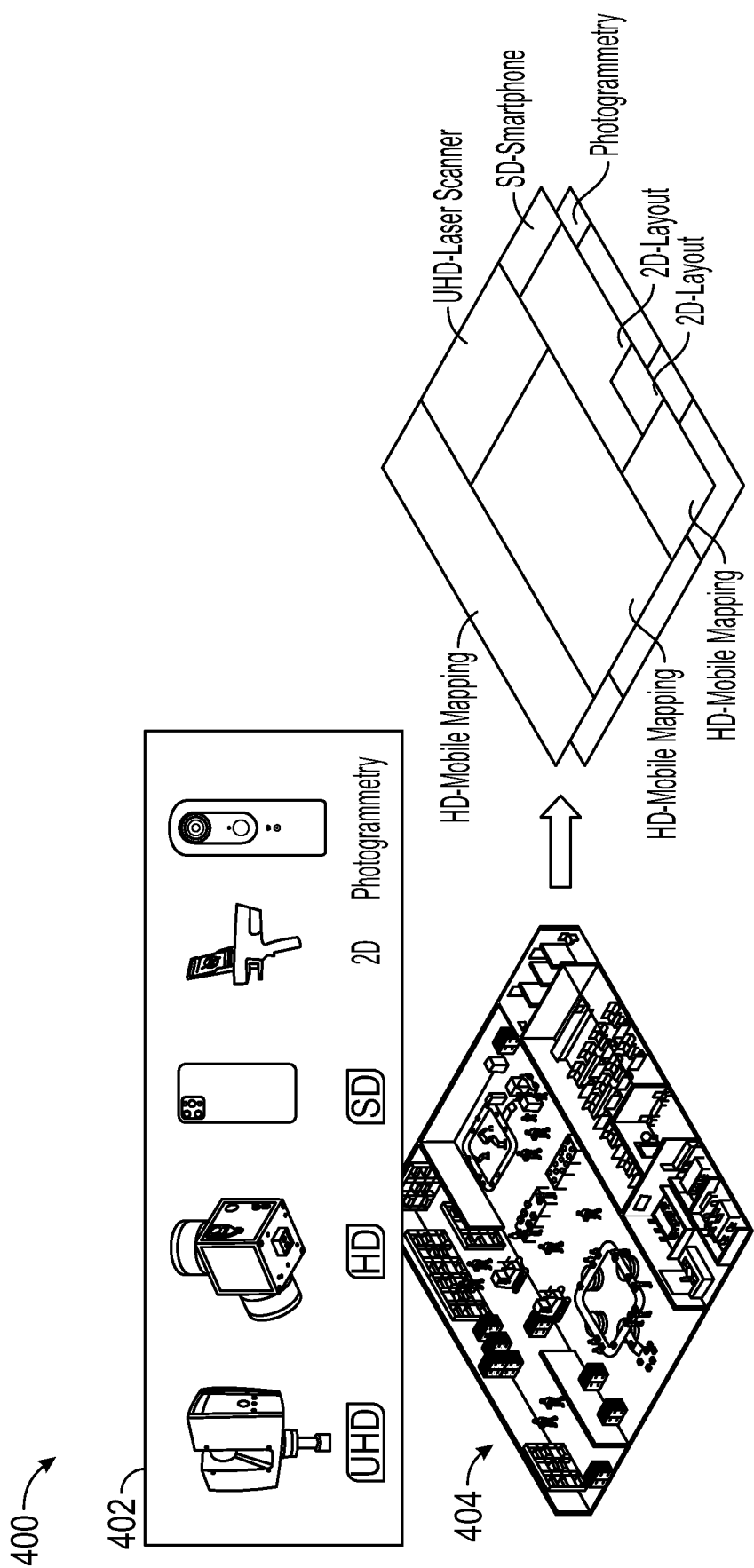
FIG. 4 is a schematic illustration of a system and method of generating a single 4D spatial model from multiple data sources in accordance with an embodiment.

At block 302, the processing system creates the 4D model, which is shown in more detail in FIG. 4 as discussed herein. At block 304, the processing system updates the 4D model, which is shown in more detail in FIG. 5 as discussed herein. At block 306, the processing system enriches the 4D model, which is shown in more detail in FIG. 6 as discussed herein.

Additional processes also may be included, and it should be understood that the process depicted in FIG. 2 represents an illustration, and that other processes may be added or existing processes may be removed, modified, or rearranged without departing from the scope of the present disclosure.

Referring now to FIG. 4, an overview of the create step (e.g., block 302 of FIG. 3). A first initial model of an environment (e.g., building) can be created using different kinds of sensors 402 using different kinds of datasets. The system provides the ability to register a point cloud generated with a coordinate measurement device, such as a Focus™ laser scanner manufactured by FARO Technologies, Inc., and another point cloud generated from images with a photogrammetry software (e.g., such as Photocore™ produced by FARO Technologies) in one common coordinate system (frame of reference) including the information of time when the point cloud was generated. This principle can be applied to different kinds of sensors. Another example is a point cloud generated by a mobile mapping device that can be registered in the same coordinate system with the Focus™ laser scanner or a point cloud from a mobile device (e.g., iPhone 12) that can be registered in the coordinate system as the point clouds from the Focus™ laser scanner, the photogrammetry point cloud and the mobile mapping point cloud.

This system provides advantages in making decisions based on provided meta data which dataset is used in the case of an overlay. Example: the high-resolution 3D scan of a Focus™ laser scanner is registered with a low-resolution iPhone 3D scan (i.e. using LIDAR or photogrammetry) in the same coordinate system. Both point clouds overlap. The system can now decide to select the high-resolution version in the overlapping area to ensure that the desired available data is in the model.

The information can saved, such as to a cloud computing environment in a data model representing space (3D) and time (4D). This data model provides for storing different states of the model over time.

The sensors 402 can include one or more coordinate measurement devices, such as a "scanner" for example, which can be any suitable device for measuring 3D coordinates or points in an environment to generate data about the environment. A collection of 3D coordinate points is sometimes referred to as a point cloud. According to one or more embodiments described herein, the scanner is a three-dimensional (3D) laser scanner time-of-flight (TOF) coordinate measurement device. It should be appreciated that while embodiments herein may refer to a laser scanner, this is for example purposes and the claims should not be so limited. In other embodiments, other types of coordinate measurement devices or combinations of coordinate measurement devices may be used, such as but not limited to triangulation scanners, structured light scanners, laser line probes, photogrammetry devices, and the like. A 3D TOF laser scanner steers a beam of light to a non-cooperative target such as a diffusely scattering surface of an object. A distance meter in the scanner measures a distance to the object, and angular encoders measure the angles of rotation of two axles in the device. The measured distance and two angles enable a processor in the scanner to determine the 3D coordinates of the target.

One or more of the sensors 402 can be used to collect points for an environment at a first point in time, which the processing system then uses to create the model 404. The model 404 provides a spatial model of the environment, for example, in a single coordinate system. The model 404 includes spatial information (e.g., 3D information) as well as temporal information (e.g., based on the first point in time at which the data is collected). Data points of an object can also be captured (e.g., using stationary laser scans, mobile mapping, photogrammetry, 2D images, and/or the like, including combinations and/or multiples thereof), and these data points can be combined into the spatial model (e.g., the model 404). These data points can be independent from the source of data or number of used sensors. As an example, the basic format is a 3D point cloud (for 3D data) and a timestamp which can be generated for any 3D recording device (vendor agnostic). This is done, for example, using 2D or 3D feature detection and matching, object recognition and matching, pairwise registration of 3D data, and/or the like, including combinations and/or multiples thereof.

The 2D or 3D feature detection and matching can include performing a subsequent calculation of a relative transformation can be performed. The feature matching can use a random sample consensus (RANSAC) approach to identify feature matches.

The pairwise registration of 3D data can be performed using a 2D approach where the data (e.g., 3D coordinates) is collapsed into a pre-defined plane. This can be, for example, the x-y plane, which is based on or known for example from inertial measurement unit (IMU) or other gravity sensor. This can be referred to as "top-view based registration." Additionally or alternatively, the pairwise registration can use cloud2cloud algorithms to fine align one 3D point cloud to another based on the distance between 3D data points of one point cloud to the second point cloud. According to one or more embodiments described herein, bundle adjustment methods can be used to fine tune the result and to distribute errors substantially evenly across multiple registration targets. According to one or more embodiments described herein, the pairwise registration may be also performed on sub portions of point clouds (e.g., sub sampled point clouds and/or a spatial selection).

During the creation, one or more post processing steps can be applied to the data according to one or more embodiments described herein. For example, the data can be cleaned by removing stray points, removing transient objects, moving objects, removing reflections on windows or other reflecting surfaces, denoising the data, and/or the like, including combinations and/or multiples thereof. As another example, the data can be meshed. For example, the 3D point cloud can be translated into a mesh representation, which provides some forms of user visualization/interaction (e.g., a "dollhouse view" of a building). As used herein, a "mesh" is a representation of surfaces that may be generated from a point cloud. The mesh model may include, but is not limited to, of vertices, edges, and faces that use a polynomial representation, including triangles and quadrilaterals.

Figure 5:
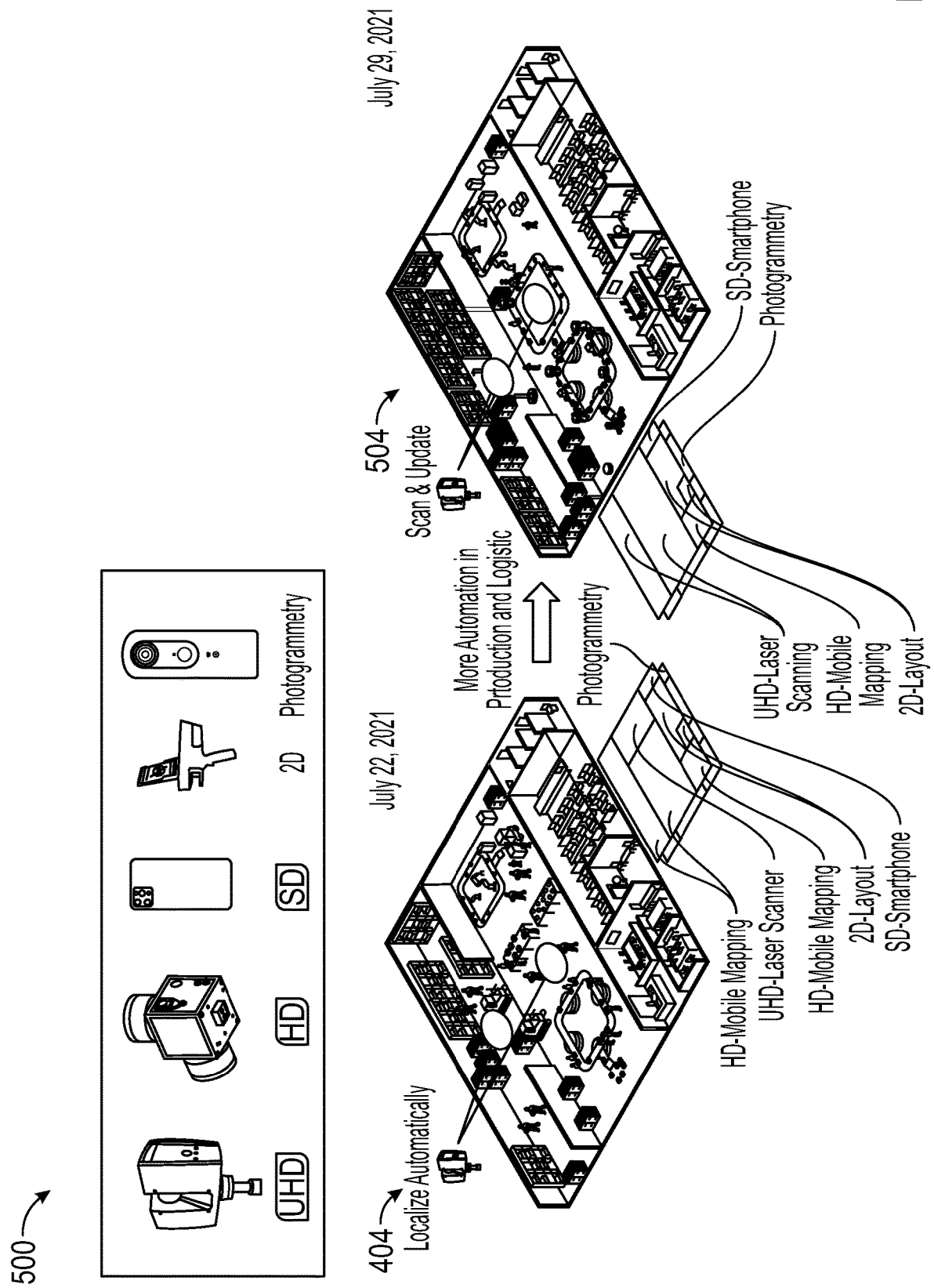
FIG. 5 is a schematic illustration of a system and method of updating an existing model in accordance with an embodiment.

Referring now to FIG. 5 a method 500 of updating the model 404 is shown (e.g., block 304 of FIG. 3). A model (e.g., the model 404) of the environment (e.g., a building) already exists. Some elements have changed in the building, and an operator is scanning a certain area again with a 3D scanning device (e.g., Focus™ scanner). The following steps are utilized to register this new dataset correctly in the existing dataset: 1) localize the sensor within existing environment (e.g., compare and match features of the existing point cloud with the new scan and deduct a position in 3D space) (described in more detail herein); 2) register new dataset in the existing model; 3) merge different qualities and overwrite only new elements with lower quality data; and 4) maintain dimension of time in dataset.

Adding updates to the 4D model provides for adding 3D coordinates collected at a second point in time that is different from the first point in time, such as acquired after the first point in time for example. The updating at block 304 of FIG. 3 does not require re-recording/re-capturing the 3D data for the entire environment. For example, 3D data for a region of interest can be captured at the second point in time and used to update the 4D model. In another example, the updated 3D data can be for a new region (e.g., a new part of the building which did not exist at the first point in time). For example, FIG. 5 shows the model 404 captured at the first point in time (e.g., Jul. 22, 2021) and an update of the model 404 as model 504 updated based on new data captured at a second point in time (e.g., Jul. 29, 2021).

As used herein, "updating" the model refers to the addition of new geometric data (2D or 3D) in contrast to arbitrary added information which is described herein and is referred to as "enriching" the model. An update is actively done by the user, for example, and typically done when some reconstruction of the environment was completed or a milestone of a construction is reached and/or periodically (e.g., daily, weekly or other scheduled recording), such as to reflect changes in a manufacturing environment for example. According to one or more embodiments described herein, multiple updates can be created over the lifetime of an environment. There may be scheduled updates and the frequency of these updates depend on the chosen recording device (e.g., every 5 years with a stationary laser scanner system, every month with a mobile mapping system, and/or the like, including combinations and/or multiples thereof).

These updates can be mixed such as where regular fast updates from a mobile mapping system are accompanied by slower stationary scan updates, for example.

According to one or more embodiments described herein, new data is registered (e.g., automatically) into the existing model (e.g., the model 404) to get a location of the new data in the coordinate system of the existing model. A (rough) registration can also be performed on site during recording or directly after the recording for fast user feedback, for example, and can be similar to an automatic localization of the sensor in the existing model.

According to one or more embodiments described herein, the new data is merged with the existing data to generate a seamless single updated model (e.g., the model 504). For example, existing data is not just overwritten with new data but when the same content is recorded both recordings are used to generate an improved quality. Quality measures of 3D data can be noise, density, point distribution, color quality, and/or the like, including combinations and/or multiples thereof.

According to one or more embodiments described herein, the data merge can be an average between multiple sets or a weighted average where the weights may represent a quality, a timestamp, type of recording, and/or the like, including combinations and/or multiples thereof. According to one or more embodiments described herein, other merges consider the benefits of the various sources and optimize data early in the calculation process. For example, for existing stationary laser scans and new mobile mapping data, the stationary data can be used as input data to the mobile mapping algorithm which optimizes the mobile mapping trajectory in accordance with this stationary data. Similarly, photogrammetry processing can benefit from existing 3D data. According to one or more embodiments described herein, the merge does not remove or change the stored data but creates new data with a new timestamp so that the complete data can be followed along a "time axis." According to one or more embodiments described herein, point cloud versioning can be used to manage the updating.

Figure 6:
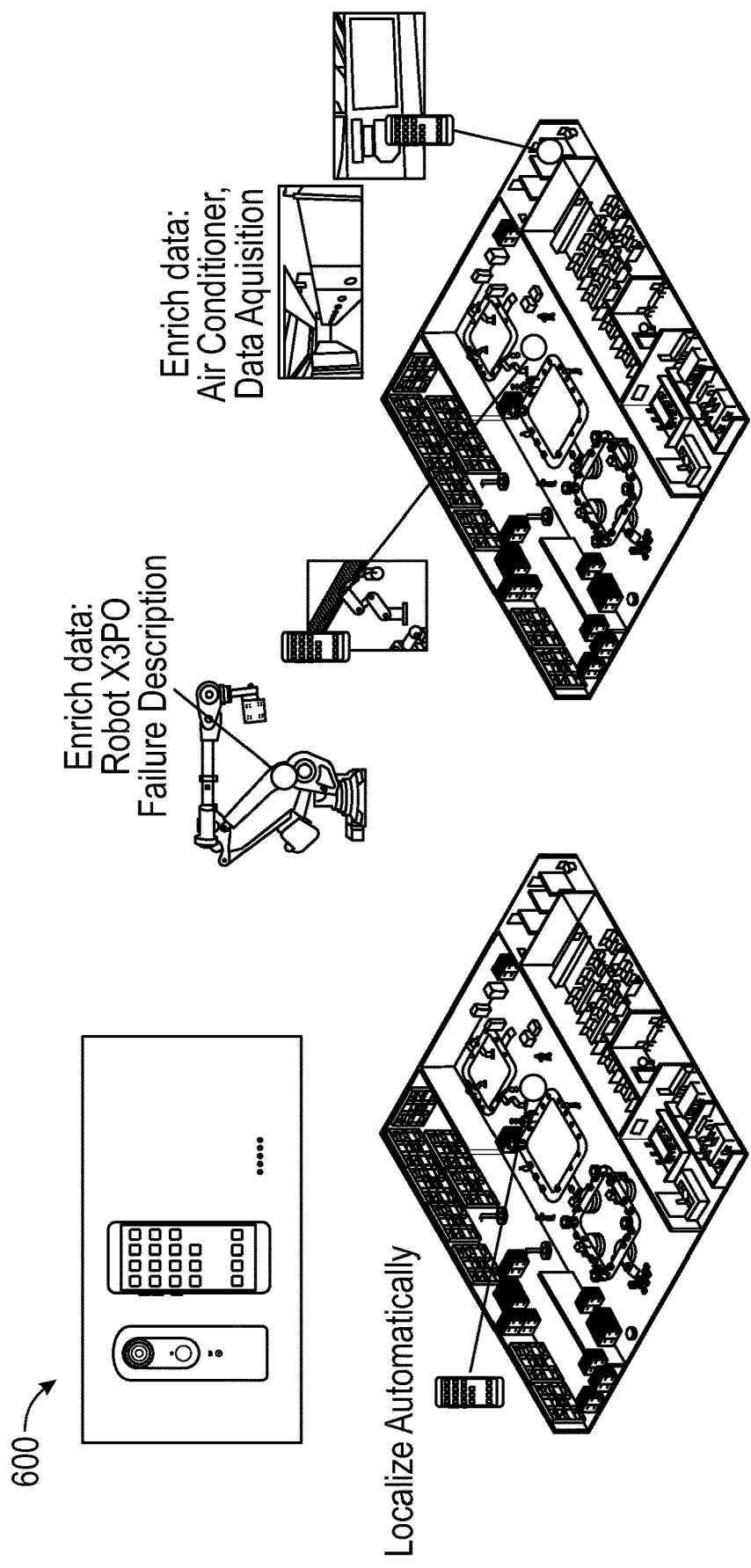
FIG. 6 is a schematic illustration of a system and method of adding geo-located time-based data to a 4D model in accordance with an embodiment.

Referring now to FIG. 6, the 4D model can be enriched. For example, a user can use low-cost devices like cameras or arbitrary mobile phones to add additional data to the model (e.g., the model 404, the model 504). This is referred to as "enriching" the model (e.g., block 306 of FIG. 5). This information can be a (single) photo of a detail, a (manually written) note, a type label for a machine, a link to a status page of a production line, reading of an environmental sensor, an audio recording, and/or the like, including combinations and/or multiples thereof. In a first step the user can select the location of the device in an overview map to roughly or approximately localize the device and then add data such as but not limited to images, text descriptions, videos, or speech. In a later version the localization of the device is done automatically. An example of such a localization is described in commonly owned U.S. Patent Application Ser. No. 63/215,126 entitled "Tracking with Reference to a World Coordinate System," the contents of which is incorporated by reference herein.

During the enriching, the additional data is localized in the model. The localization can be performed using a pre-defined location (e.g., for a machine, sensor or other device), manually by having a user locate the additional data relative to the model, automatically with an imaging system (e.g., a smartphone/tablet or panoramic camera) and/or the like, including combinations and/or multiples thereof.

As an example, the manual localization can happen off-site when a user adds a note to be consumed by a second user (e.g., a task, identified problem, measurement result, and/or the like, including combinations and/or multiples thereof).

Examples of techniques for on-site registration are described in commonly owned U.S. patent application Ser. No. 17/844,641 entitled "Markerless Registration Of Image Data And Laser Scan Data," and/or commonly owned U.S. Patent Application Ser. No. 63/354,928 entitled "Image Localization Using A Digital Twin Representation of an Environment," the contents of both of which are incorporated by reference herein.

As an example, the automatic localization can occur as follows. An image is captured with the imaging device (e.g., a camera, a smartphone, and/or the like, including combinations and/or multiples thereof). Photogrammetric methods such as feature extraction and matching, object recognition (e.g., using machine learning techniques), and/or the like, including combinations and/or multiples thereof, the location of the current image is found in the 4D model. Optional GPS data can be used when available. In an example, a video or other sequence of images with some movements can be used to photogrammetrically calculate some 3D data to assist in the localization. The additional data can be directly located at the image position, for example.

The additional data can also be placed more accurately relative to the identified image position. For example, the user specifies on a handheld device (e.g., a smartphone) a point on a surface that should contain the additional information such as by selecting it on a touch screen of the device or certain targets are automatically identified as points of interest (e.g., type labels). This can be accomplished using one or more of the following approaches individually and/or in combination. As an example, a selected point on the 2D smartphone data is found again in the existing model by calculating the intersection of selected "object ray" with the 3D environment. As another example, from a single image some 3D information is estimated (e.g., using machine learning). Now each pixel of the imaging device contains depth information and the selected point is known in 3D. As yet another example, multiple images (e.g., a video stream) are used to generate a rough 3D representation of the observed scenery. Again the selected point can be found in 3D. The automatic localization can be used to initially locate fixed objects (e.g., machines, robots, air conditioners, shelves, security cameras, and/or the like, including combinations and/or multiples thereof) in the model (e.g., the model 504). The automated localization based on images in the 4D model is a desired to provide ease-of-use to the other and removing the need to carry around another device for localization.

According to one or more embodiments described herein, when a machine, sensor, or even a complete production line is connected to a cloud computing environment, additional data can be automatically synced to the model. For example, some cloud providers offer a solution to connect Internet of Things (IoT) devices to cloud services. Such additional data can include status reports, failure description, usage statistics, sensor readings, and/or the like, including combinations and/or multiples thereof. In such cases, the device may be pre-localized as described herein so that the additional data is attached to a 3D position in the model. A unique device identifier in each IoT message can be used to provide for the correct data to be attributed to the correct coordinate and/or machine.

Figure 7:
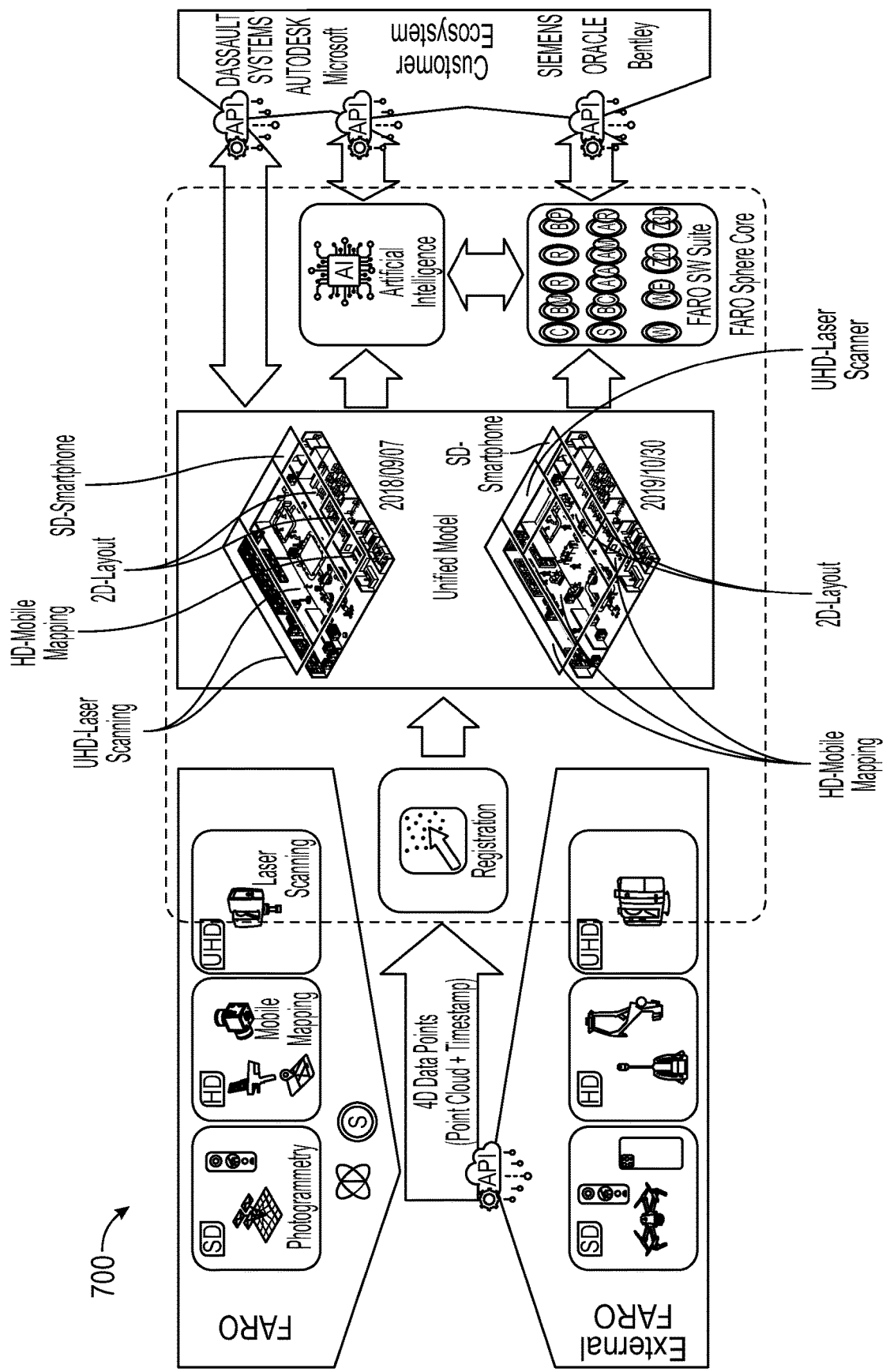
FIG. 7 is schematic illustration of the 4D platform in accordance with an embodiment.

FIG. 7 depicts a block diagram of an architecture 700 for implementing the method of FIG. 3 according to one or more embodiments described herein. Particularly, the architecture 700 provides for creating a 4D model, updating the 4D model, and enriching the 4D model.

According to one or more embodiments described herein, the method 300 and/or the architecture 700 can provide additional features and functions, such as providing for collaboration to share and update/enrich models, processing and analyzing models, and/or archiving models.

Collaboration is now described. For example, the 4D model enables a variety of workflows. For example, the cloud connection shown in FIG. 7 provides for and simplifies the collaboration and data sharing between different platform users. Sharing and collaboration is enabled by the 4D data model structure (as described herein) which provides for simultaneous access. According to an embodiment, an API is offered for connection with external partners (e.g., external cloud providers, external model viewing analysis platforms, and/or the like, including combinations and/or multiples thereof). This enables data interaction by third parties. Externally developed applications can access the 4D model, can query for specific interactions, and/or can add data to the model. For example, a 3D design software can extract a portion of a point cloud so a user can design a new component (e.g., a production line) directly in the correct environment. After finalization, this model is added back to the 4D model so any user can review the proposal. This provides for the customer to stay in the customer's productive ecosystem and still uses the present platform for all model related tasks. According to one or more embodiments described herein, the API can also provide for usage of the processing and analyses services in the platform to extract relevant data from the 4D data model as is now described.

Particularly, the 4D model can be processed and analyzed, such as using third-party software. An example of such third-party software is a computer-aided design (CAD) software that can be used to visualize and/or analyze the 4D model, perform measurements using data of the 4D model, compare the 4D model over time, and/or the like, including combinations and/or multiples thereof. As an example, a general input into the 4D model is a point cloud with a timestamp. In some examples, as described herein, the 4D model also includes additional data, such as images, annotations, etc. In some cases, raw data may be uploaded together with a timestamp and this raw data can be converted to relevant 3D data after the import in a processing step. For example, collection of images is processed by photogrammetry to 3D data and/or raw mobile mapping data (e.g. bag file from the ROS based data recorder) is processed into a consumable point cloud.

The architecture 700 may provide tools to analyze the 4D model. As an example, geometric values (e.g., angles, distances, flatness, and/or the like, including combinations and/or multiples thereof) can be extracted from the 4D model. For example, manually or semi-manually selected points can be used to calculate the geometric values. Semi-manual selections mean that a user does not specify the exact point but from a rough selection an optimal point is chosen. For example, the user selects a point or group of points in the neighborhood of a corner and the selection is created at the point where three neighboring planes intersect. As another example, the user selects one or more points on a plane and the complete plane is found by standard point cloud segmentation algorithms (like region growing). As another example, geometric primitives (planes, cylinders, spheres) are automatically identified in a point cloud model. A user selection in a point cloud is translated to a selection of one of these primitives.

The architecture 700 may also provide for calculating areas and volumes, such as based on a selection of points as described herein. For example, a finite plane (e.g. a wall or floor of a room) is found and an area can be calculated. As another example, a 3D section is extracted by means of segmentation (e.g., a robot cell) to calculate volume, height, and/or the like, including combinations and/or multiples thereof.

The architecture 700 may also provide for identification of differences between points in time. For example, a pairwise calculation can be used to identify differences between point clouds. For example, a user can specify two different points in time (timestamps) to compare, and the data can be preprocessed with filtering, smoothing, etc. techniques. A difference can be calculated by calculating point cloud distances (e.g., with an algorithm that provides a distance between one point in the first point cloud and a second point/group of points in the second point cloud, such as the M3C2 algorithm for example). This is not be limited to point clouds. Also point-to-mesh or point-to-CAD distances are of interest. An example of a technique for displacement/change detection between point clouds is described in commonly owned U.S. patent application Ser. No. 17/738,890 entitled "Detecting Displacements And/Or Defects In A Point Cloud Using Cluster-Based Cloud-To-Cloud Comparison," the contents of which is incorporated by reference herein.

The architecture 700 may also provide for identification and counting of defined objects. This can be accomplished with machine learning models that are trained to identify certain objects (in 2D or 3D) and/or with classical algorithms to find objects in 3D point clouds.

The architecture 700 may also provide for tracking of changes along the time axes. For example, differences are not just calculated between two timestamps (as described herein). Rather, for timestamps a difference is calculated either from one point in time to the next (relative changes) or from the first point in time to each later point in time (absolute changes). Similarly, measurement values or non-geometrical added data (as described regarding the "enriching" of the 4D model) which are extracted/generated for a certain feature can be calculated for each point in time and therefore tracked. Also identified objects can be tracked or compared between timestamps.

According to one or more embodiments described herein, the architecture 700 also provides for archiving the 4D model. For example, after an environments' lifetime, the 4D model of the environment may be archived. This may also happen after certain object milestones after which some of the detailed time based information is not relevant anymore. This can happen after a larger rework of the facility when the full timeline of a specific section (e.g., a production line) will not be accessed anymore. Some portions of the 4D model may be simplified or removed when the model or a sub-set of the model is archived, for example. The sub-set may be spatial (e.g., a room, a floor, a building, and/or the like, including combinations and/or multiples thereof) or temporal (e.g., changes before a defined date) or both. The portions to be removed may be 3D data or any metadata as specified by the user Archived models (or sub models) may be stored in so called "deep archive" cloud buckets which offer low price storage at increased data retrieval times (several hours compared to seconds). The change of storage type in the cloud may be done automatically for portions of the model where the access rate shows a vanishing interest. For example, when the 3D point cloud data with a certain timestamp is not accessed for a defined period of time (e.g., 1 month, 1 year, and/or the like, including combinations and/or multiples thereof), this portion of the 4D model may be stored in a different storage class to optimize costs, better utilize storage resources, reduce bandwidth, etc.

According to one or more embodiments described herein, the 4D model improves computer functionality by integrating spatial, temporal, and supplemental information into a single model. The resulting 4D model reduces complexity and data storage requirements, for example, by providing a single model that contains the spatial, temporal, and supplemental information such that the information can be stored together instead of in disparate locations, reducing storage, processing, and memory complexity and thus improving processing system (e.g., computer) functionality.

Figure 8:
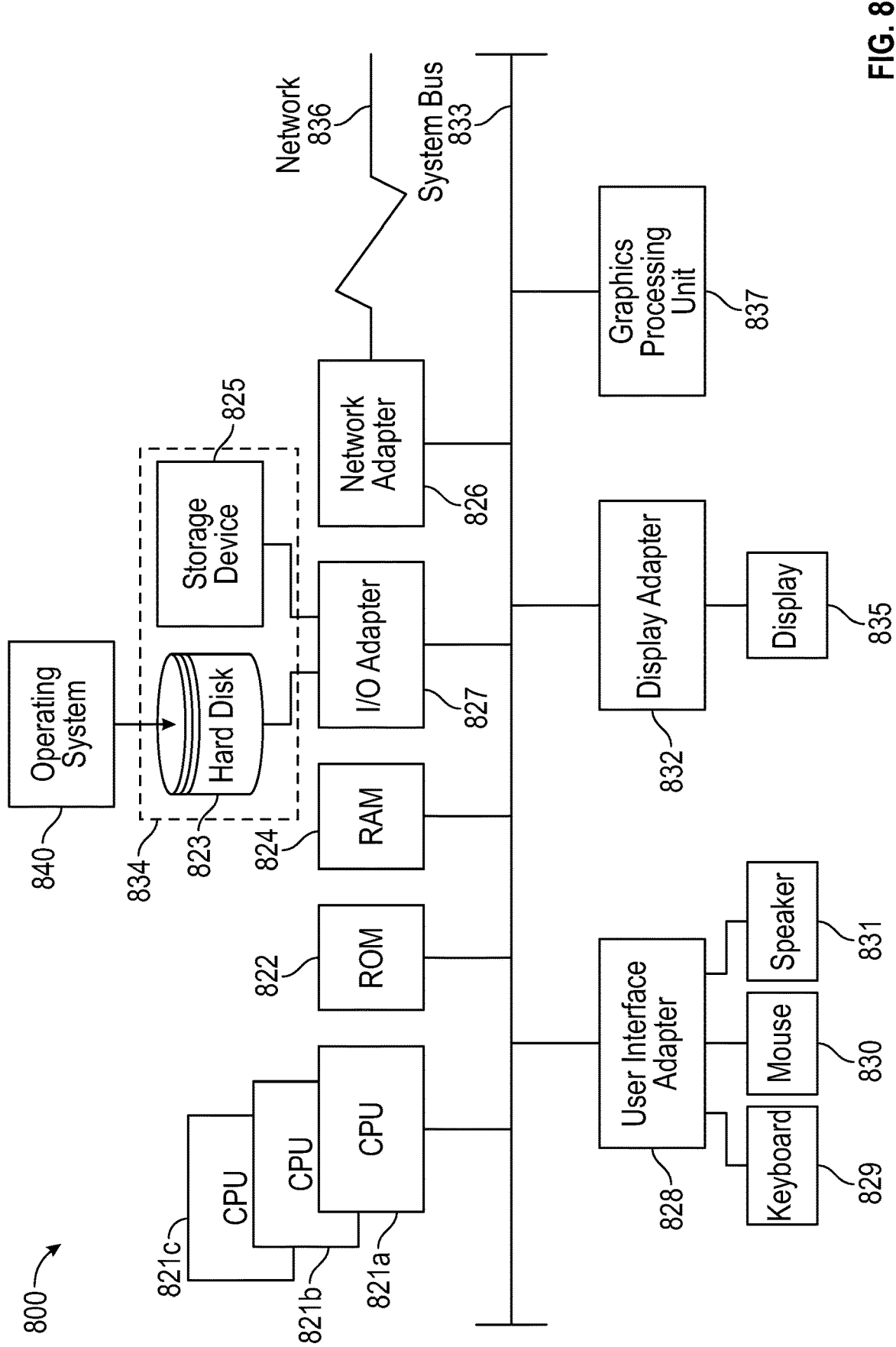
FIG. 8 is a block diagram of a processing system according to one or more embodiments described herein.

It is understood that one or more embodiments described herein is capable of being implemented in conjunction with any other type of computing environment now known or later developed. For example, FIG. 8 depicts a block diagram of a processing system 800 for implementing the techniques described herein. In accordance with one or more embodiments described herein, the processing system 800 is an example of a cloud computing node of a cloud computing environment. In examples, processing system 800 has one or more central processing units ("processors" or "processing resources" or "processing devices") 821a, 821b, 821c, etc. (collectively or generically referred to as processor(s) 821 and/or as processing device(s)). In aspects of the present disclosure, each processor 821 can include a reduced instruction set computer (RISC) microprocessor. Processors 821 are coupled to system memory (e.g., random access memory (RAM) 824) and various other components via a system bus 833. Read only memory (ROM) 822 is coupled to system bus 833 and may include a basic input/output system (BIOS), which controls certain basic functions of processing system 800.

Further depicted are an input/output (I/O) adapter 827 and a network adapter 826 coupled to system bus 833. I/O adapter 827 may be a small computer system interface (SCSI) adapter that communicates with a hard disk 823 and/or a storage device 825 or any other similar component. I/O adapter 827, hard disk 823, and storage device 825 are collectively referred to herein as mass storage 834. Operating system 840 for execution on processing system 800 may be stored in mass storage 834. The network adapter 826 interconnects system bus 833 with an outside network 836 enabling processing system 800 to communicate with other such systems.

A display 835 (e.g., a display monitor) is connected to system bus 833 by display adapter 832, which may include a graphics adapter to improve the performance of graphics intensive applications and a video controller. In one aspect of the present disclosure, adapters 826, 827, and/or 832 may be connected to one or more I/O busses that are connected to system bus 833 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 833 via user interface adapter 828 and display adapter 832. A keyboard 829, mouse 830, and speaker 831 may be interconnected to system bus 833 via user interface adapter 828, which may include, for example, a Super I/O chip integrating multiple device adapters into a single integrated circuit.

In some aspects of the present disclosure, processing system 800 includes a graphics processing unit 837. Graphics processing unit 837 is a specialized electronic circuit designed to manipulate and alter memory to accelerate the creation of images in a frame buffer intended for output to a display. In general, graphics processing unit 837 is very efficient at manipulating computer graphics and image processing, and has a highly parallel structure that makes it more effective than general-purpose CPUs for algorithms where processing of large blocks of data is done in parallel.

Thus, as configured herein, processing system 800 includes processing capability in the form of processors 821, storage capability including system memory (e.g., RAM 824), and mass storage 834, input means such as keyboard 829 and mouse 830, and output capability including speaker 831 and display 835. In some aspects of the present disclosure, a portion of system memory (e.g., RAM 824) and mass storage 834 collectively store the operating system 840 to coordinate the functions of the various components shown in processing system 800.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should also be noted that the terms "first", "second", "third", "upper", "lower", and the like may be used herein to modify various elements. These modifiers do not imply a spatial, sequential, or hierarchical order to the modified elements unless specifically stated.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A method comprising:
    generating a four-dimensional (4D) model of an environment based on three-dimensional (3D) coordinates of the environment captured at a first point in time corresponding to a first timestamp;
    updating the 4D model based at least in part-te on an update to at least a subset of the 3D coordinates of the environment captured at a second point in time corresponding to a second timestamp; and
    enriching the 4D model by adding supplemental information comprising at least one of text entered by a user, an image from a camera that is localized on the 4D model, and data from a device;

removing at least one of a stray point, a transient object, and a reflection data based on timestamps;

storing the 4D model in a first storage location;

archiving a subset of the 4D model based on access thereof over time and a timestamp relating to the subset, the archiving being to a second storage location having an access rate that is slower than the first storage location, the subset of the 4D model including at least one of 3D data and metadata.

2. The method of claim 1, wherein generating the 4D model comprises performing at least one of feature detection and matching, object recognition and matching, and pairwise registration.

3. The method of claim 2, wherein the feature detection and matching is performed using a random sample consensus approach to identify feature matches.

4. The method of claim 2, wherein the pairwise registration is performed using a two-dimensional approach to collapse the 3D coordinates into a pre-defined plane.

5. The method of claim 2, wherein the pairwise registration is performed using a cloud2cloud algorithm.

6. The method of claim 1, wherein the generating of the 4D model comprises performing post processing on the 3D coordinates.

7. The method of claim 6, wherein the post processing comprises:

at least one of moving an object and performing denoising; and performing the removing of at least one of a stray point, a transient object, and a reflection data based on a timestamp.

8. The method of claim 1, wherein the 3D coordinates are obtained from at least one of (i) a laser scanner, (ii) a lidar sensor of a smartphone or mobile scanner, and (iii) an imaging device-via in conjunction with a photogrammetry technique.

9. The method of claim 1, wherein updating the model comprises registering the at least the subset of the 3D coordinates of the environment to the 4D model.

10. The method of claim 1, wherein a timestamp is associated with the supplemental information.

11. The method of claim 1, wherein enriching the 4D model comprises localizing the supplemental information to the 4D model.

12. The method of claim 1, further comprising processing and analyzing the 4D model.

13. A system comprising:

a memory comprising computer readable instructions; and a processing device for executing the computer readable instructions, the computer readable instructions controlling the processing device to perform operations comprising:

generating a four-dimensional (4D) model of an environment based on three-dimensional (3D) coordinates of the environment captured at a first point in time;

updating the 4D model based at least in part to an update to at least a subset of the 3D coordinates of the environment captured at a second point in time; and enriching the 4D model by adding supplemental information comprising text, an image, or data from a device to the model;

removing at least one of a stray point, a transient object, and a reflection data based on timestamps;

storing the 4D model in a first storage location;

archiving a subset of the 4D model based on spatial and temporal characteristics, the archiving being to a second storage location, the second storage location having an access rate that is slower than the first storage location, the subset of the 4D model including at least one of 3D data and metadata.

14. The system of claim 13, further comprising a 3D coordinate measurement device to capture the 3D coordinates of the environment.

15. The system of claim 14, wherein the 3D coordinate measurement device is a laser scanner.

16. The system of claim 13, wherein the supplemental information is captured by a camera.

17. A method comprising:

localizing a sensor within a physical environment using at least one of text, an image, and data from a device;

registering a dataset in model of the physical environment;

generating a four-dimensional (4D) model of the physical environment based on the dataset and timestamps of data captured in the dataset;

removing at least one of a stray point, a transient object, and a reflection data based on timestamps;

merging different qualities of data within the dataset and overwriting corresponding elements with lower quality data;

maintaining dimension of time in dataset as a timestamp representing the time of collection of the data;

storing the 4D model in a first storage location; and archiving a subset of the 4D model based on access thereof over time and a timestamp relating to the subset, the archiving being to a second storage location having an access rate that is slower than the first storage location, the subset of the 4D model including at least one of 3D data and metadata.

18. The method of claim 17, wherein the localizing of the sensor further comprises comparing and matching features of an existing point cloud with a new scan and determining a position in 3D space.

* * * * *